UNITED STATES PATENT OFFICE.

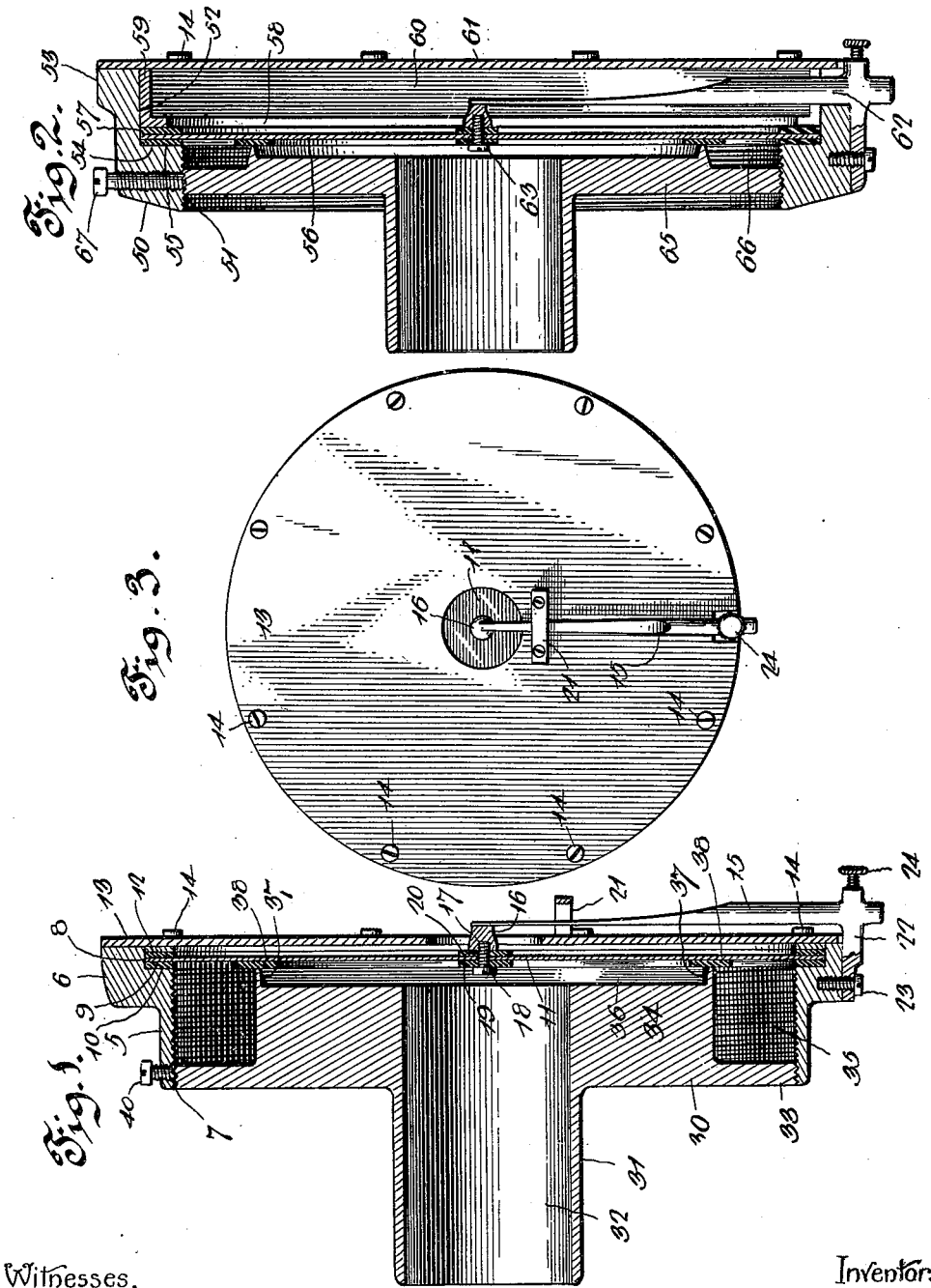

HENRY S. MONTGOMERY, OF TOPEKA, KANSAS.

GRAMOPHONE SOUND-BOX.

SPECIFICATION forming part of Letters Patent No. 652,800, dated July 3, 1900.

Application filed August 15, 1899. Serial No. 727,316. (No model.)

*To all whom it may concern:*

Be it known that I, HENRY S. MONTGOMERY, a citizen of the United States, residing at Topeka, in the county of Shawnee and State of Kansas, have invented a new and useful Sound-Box for Gramaphones, of which the following is a specification.

This invention relates to sound-boxes in general, and more particularly to that class employed in connection with the reproducing-diaphragms of gramophones, although the structure and principles involved may be employed in connection with sound-producing diaphragms used in other connections.

One object of the invention is to provide a construction in which the vibrations of great frequency will be absorbed or eliminated to remove the objectionable squeaks and similar foreign sounds and also to utilize the effective energy of a diaphragm of large diameter which under ordinary circumstances has not sufficient rapidity of vibration to produce the proper sound.

A further object of the invention is to provide a construction that will be more durable than that usually employed and in which the delicate parts may be entirely inclosed.

Further objects of the invention will be evident from the following disclosure.

In the drawings forming a portion of the specification, and in which like numerals of reference indicate similar parts in the several views, Figure 1 is a central section taken longitudinally of the stem and diametrically of the diaphragm, the stylus-carrying arm being shown in elevation. Fig. 2 is a section similar to Fig. 1 and showing a modification of interior structure and the employment of a cap or cover to inclose the stylus-arm. Fig. 3 is a top plan view of Fig. 1.

Referring now to the drawings, and more particularly to Figs. 1 and 3, 5 represents a cylindrical sound-box, at one end of which is formed an annular and radial flange 6. The interior of the box 5 is provided with threads 7 for a portion of its length, said threads terminating at the lower edge of an annular groove 8, formed at one end of the box and in the flange 6, this groove being, in effect, a widened bore of the box and having a side wall 9.

Against the wall 9 is placed an elastic gasket 10, of rubber or other suitable material, against which is disposed a diaphragm 11, preferably of mica. Upon the diaphragm and directly above the gasket 10 is a second and similar gasket 12, upon which and the adjacent end of the box is disposed a disk-shaped plate 13, held in place by means of screws 14, passed therethrough and into the end face of the flange 6, the thickness of the gasket 12 being such that it will be compressed by the plate 13 when the latter is screwed into place.

A stylus-carrying arm 15 has a block 16 fixed to the under side of its inner end, and which block is provided with a perforation 17, having threads for engagement by a screw 18, passed upwardly and through a central perforation in the diaphragm 11, a rubber washer 19 being disposed at one side of the diaphragm, between it and the head of the screw, while a second and similar washer 20 is disposed between the block 16 and the adjacent side of the diaphragm and encircles the stem of the screw, the stylus-arm being thus held fixedly in place and against displacement due to excessive vibration of the diaphragm.

The inner end of the arm 15 is preferably passed through a guide 21 and is made thinner vertically at its inner end, the outer end of the arm being cylindrical, as shown, and formed integral with a bracket 22, extending at right angles thereto and fixed within a recess in the periphery of the box through the medium of the screws 23, the arm having thus a comparatively-stiff connection with the box. The arm 15 is provided at its outer end with a central perforation for the reception of the stylus, and which need not be shown, the stylus being held in place by means of a set-screw 24, as is usual.

Engaging the threads 7 upon the inner wall of the box is a plug 30, having a central stem 31, through which and the plug is formed the usual sound-passage 32. That portion of the plug 30 engaging the threads 7 is in the form of a flange 33 at the outer end of the diminished portion 34, this diminished portion being separated from the inner face of the box through the medium of an interspace or chamber 35. The inner end of the diminished portion 34 is provided with a concentric and circular recess 36, resulting in the formation of a flange 37, forming a continuation of the periphery of the portion 34. This flange 37 bears directly upon the elastic gasket 38, disposed against the lower face of the diaphragm. The result of this construction is that upon the movement of the stylus-arm the diaphragm 11 will be vibrated and that it will not only vibrate in its entirety, but will break up into two parts or sections, one of which will have the recess 36 as a resonator, while the other portion, lying between the flange 37 and the inner wall of the box, will have the chamber 35 as its resonator. The recess 36 is extremely shallow, and thus the volume of air therein does not absorb the vibrations of the central portion of the diaphragm, but instead transmits its vibrations through the sound passage or tube 32. On the other hand, the great depth of the chamber 35 contains a volume of air that absorbs the high and weak tones. Moreover, the gasket 38 tends normally to limit the effective vibration of the diaphragm to that part inclosed thereby, while under excessive conditions the yielding of the gasket permits the diaphragm to vibrate in its entirety, and thus to give forth a greater volume than would be possible with a diaphragm of small diameter. Moreover, it is found that the shrill and metallic sounds and whistling noises are entirely eliminated. In order to hold the plug at the proper point of its adjustment to maintain proper tension of the diaphragm, a set-screw 40 is passed through a threaded perforation in the wall of the box and engages the periphery of the flanged portion 33 of the plug.

Referring now to Fig. 2 of the drawings, in this construction a box 50 is employed, the interior of which is threaded, as shown at 51, at one end of the box, the opposite end of the box being increased in interior diameter, as shown at 52, and having a flange 53 upon the outer periphery of the adjacent end. This increase in interior diameter results in the formation of a wall 54, against which is placed a gasket 55, which receives the diaphragm 56. Upon this diaphragm is arranged a gasket 57, and within the box and resting upon the gasket 57 is a flange 58 upon the inner periphery of a bushing 59, which extends to the outer end of the box and results in the formation of a chamber 60 above the diaphragm. A cover or closure 61 for this chamber is screwed upon the end of the box and engages the bushing 59 and forces its flange 58 against the gasket 57 to hold the diaphragm in position. In this construction an opening is formed in one wall of the box for the reception of the stylus-arm 62, which is held in place in the manner above described, the inner end of the arm being firmly secured to the diaphragm by means of the screw 63 and which connection is similar in every respect to that shown in Fig. 1. The plug 65 in this construction is similar to the plug 30, with the exception that it is shorter, and the chamber 66 thereof, corresponding to the chamber 35, has a lesser depth, and, if desired, the depth of this chamber may be made no greater than that of the central recess in the end of the plug.

The structure shown in Fig. 2 is provided with a set-screw 67 for the same purpose as that shown in Fig. 1, and from the above description it will be seen that the several objects of the invention have been secured.

It will of course be understood that in practice the specific construction shown and described may be varied, that any suitable materials may be employed, and that any desired proportions may be observed without departing from the spirit of the invention.

As above mentioned, the inner end of the stylus-carrying arm is reduced in diameter in the direction of vibration of the diaphragm, and, as shown in the drawings, the object of this reduction in diameter being to form a spring, so that the arm will be yieldable with respect to the diaphragm, the result being a more efficient operation of the apparatus.

What I claim is—

1. The combination with a sound-box, of a diaphragm therein and fixed thereto at the periphery of the diaphragm, a plug in the box engaging the diaphragm at one side intermediate its center and periphery to establish a node, a separate resonator for each segment of vibration of the diaphragm, said diaphragm being adapted to vibrate in its entirety and in segments, and a stylus operatively connected with the diaphragm at the opposite side from the plug.

2. The combination with a sound-box, of a diaphragm fixed in the box at the periphery of the diaphragm, a plug in the box, a cushion between the plug and the diaphragm and engaging the diaphragm at one side thereof between its periphery and its center to establish a node, a separate resonator for each segment of vibration of the diaphragm, whereby the diaphragm will vibrate in its entirety and in sections, and a stylus operatively connected with the diaphragm at the opposite side from the plug.

3. The combination with a sound-box, of a diaphragm therein and fixed thereto, said diaphragm having a yieldable support at one side between its center and its connection with the box, whereby the diaphragm will vibrate in its entirety and in sections, a separate resonator for each section of the diaphragm, and a stylus operatively connected with the diaphragm for vibrating it.

4. The combination with a sound-box, of a diaphragm having a yieldable connection with the box, a yieldable contact with the diaphragm intermediate said connection and the center of the diaphragm, whereby the diaphragm will vibrate in its entirety and in sections, and a stylus operatively connected with the diaphragm for vibrating it.

5. The combination with a sound-box, of a diaphragm yieldably connected with the box, a yieldable contact with the diaphragm on a continuous line concentric with the diaphragm, whereby the diaphragm will vibrate in its entirety and in sections, and a stylus operatively connected with the diaphragm for vibrating it.

6. The combination with a sound-box, of a diaphragm within the box and connected thereto, and a plug adapted for engagement with the box, said plug having a sound-tube, and concentric recesses in the end of the plug resulting in the formation of a flange, said flange lying between the peripheries of the plug proper and the edge of the sound-tube and engaging the diaphragm between its center and its connection with the sound-box, whereby the diaphragm will vibrate in sections.

7. The combination with a sound-box, of a diaphragm within the box and fixed thereto, and a plug, said plug having concentric depressions in its end, said depressions having different depths and resulting in the formation of a flange adapted for engagement with the diaphragm between its center and its connection with the box, whereby the diaphragm will vibrate in its entirety and in sections.

8. The combination with a sound-box having a diaphragm yieldably connected therewith, of a plug for the box having concentric recesses in its end resulting in the formation of a flange, a gasket disposed between the flange and the diaphragm and in contact with both, said gasket engaging the diaphragm between its center and its connection with the box, whereby the diaphragm will vibrate in its entirety and in sections, a sound-tube leading through the plug, and a stylus connected with the diaphragm for operating it.

9. The combination with a sound-box and the diaphragm therein, of a sound-tube in operative relation to the diaphragm, a bushing adapted to hold the diaphragm in place, a cover for the bushing and diaphragm and engaged with the box, and a stylus-arm connected with the diaphragm and lying between it and the cover.

10. The combination with a sound-box having a diaphragm therein, of an arm adapted to receive a stylus and having rigid connection with the box, and with the diaphragm, said arm having a spring portion intermediate its points of connection and the point of connection of the arm with the box being between the stylus-receiving end and the point of attachment to the diaphragm.

11. The combination with a sound-box having a diaphragm, of a stylus-arm fixed rigidly to the box and to the diaphragm and adapted to receive a stylus, said arm being reduced in diameter in the direction of vibration of the diaphragm to form a spring and the point of connection of the arm with the box being between the stylus-receiving end and the point of attachment to the diaphragm.

12. The combination with a sound-box, of a diaphragm therein, said diaphragm having a support at one side between its center and its connection with the box, whereby the diaphragm will vibrate in its entirety and in sections, and a stylus-arm connected rigidly with the box, said arm being connected with the diaphragm at one side of its connection with the box and having a stylus at the opposite side of its connection with the box, whereby the stylus and diaphragm will be operated, one by the other.

In testimony that I claim the foregoing as my own I have hereto affixed my signature in the presence of two witnesses.

HENRY S. MONTGOMERY.

Witnesses:
   GEO. H. CHANDLEE,
   HARRY H. HOLLANDER.